(12) United States Patent
Kapulkin et al.

(10) Patent No.: US 9,245,376 B2
(45) Date of Patent: Jan. 26, 2016

(54) LIGHTING MANAGEMENT IN VIRTUAL WORLDS

(71) Applicants: Arseny Kapulkin, San Francisco, CA (US); David Baszucki, Portola Valley, CA (US); Semen Kozlov, Burlingame, CA (US)

(72) Inventors: Arseny Kapulkin, San Francisco, CA (US); David Baszucki, Portola Valley, CA (US); Semen Kozlov, Burlingame, CA (US)

(73) Assignee: Roblox Corporation, San Mateo, CA (US)

( * ) Notice: Subject to any disclaimer, the term of this patent is extended or adjusted under 35 U.S.C. 154(b) by 392 days.

(21) Appl. No.: 13/894,019

(22) Filed: May 14, 2013

(65) Prior Publication Data

US 2014/0342823 A1 Nov. 20, 2014

(51) Int. Cl.
*G06T 15/50* (2011.01)
*G06T 15/08* (2011.01)
*H04N 21/63* (2011.01)
*A63F 13/355* (2014.01)

(52) U.S. Cl.
CPC ............... *G06T 15/50* (2013.01); *A63F 13/355* (2014.09); *G06T 15/08* (2013.01); *H04N 21/63* (2013.01); *A63F 2300/66* (2013.01); *G09G 2370/022* (2013.01)

(58) Field of Classification Search
None
See application file for complete search history.

(56) References Cited

U.S. PATENT DOCUMENTS

| | | | | |
|---|---|---|---|---|
| 5,563,989 A * | 10/1996 | Billyard | ........................ | 345/426 |
| 6,130,671 A * | 10/2000 | Argiro | ........................ | 345/424 |
| 2002/0154113 A1* | 10/2002 | Roelofs | ........................ | 345/419 |
| 2004/0075658 A1* | 4/2004 | Goto | ........................ | 345/426 |
| 2006/0028468 A1* | 2/2006 | Chen et al. | ........................ | 345/424 |
| 2011/0202845 A1* | 8/2011 | Mountjoy | ........................ | 715/733 |
| 2014/0267264 A1* | 9/2014 | Crassin et al. | ........................ | 345/424 |

* cited by examiner

*Primary Examiner* — Joni Richer
(74) *Attorney, Agent, or Firm* — Donald R. Boys; Central Coast Patent Agency, Inc.

(57) ABSTRACT

A system has a server with a processor, a storage medium and coded instructions executable on the processor causing the server to display a video game to a player operating a computer, the video game comprising a virtual world having objects with surfaces, movable in the space of the virtual world by the player, and one or more light sources, create and manage a voxel grid associated with the player, compute an occupancy value for individual ones of the cells of the grid, compute an illumination value for cells of the grid by consideration of position and direction of the light sources, the occupancy value of the cell, and illumination values of immediately adjacent cells in the voxel grid, and determine brightness for pixels in display of surfaces of objects in frames of the video game based on the illumination values of cells proximate to the surfaces of the objects.

16 Claims, 15 Drawing Sheets

LIGHTING MANAGEMENT IN VIRTUAL WORLDS

BACKGROUND OF THE INVENTION

1. Field of the Invention

The present invention is the technical area of displaying objects and landscapes in a virtual world, and pertains more particularly to managing lighting applied to the objects and landscape elements.

2. Description of Related Art

Virtual worlds, and processes and techniques for displaying objects and landscapes in such systems are well-known in the art. One example is the technical area of video games, which present dynamic renditions of characters (persons) often termed "avatars" in the art. Such dynamic video displays may be "first-person", in which the sequential development is from the perspective of an avatar, or third-person, in which various moving objects and avatars may be displayed from a narrative perspective. In any case game videos typically present avatars and other objects that dynamically move in the progressing display, and physics calculations may be heavily incorporated to control how avatars and other objects react with one another, to lend as much of a sense of reality to the action displayed as possible and practical. A further important point is the nature of video games, that is, that they are interactive with at least one player, and may be interactive with a plurality of players. A player in such a game is enabled to manipulate an avatar through input mechanisms, and may be enabled for other parameters and effects as well, such as changing interactivity between avatars or avatars and other objects in the game. A player may also be enabled to control other aspects of a game.

One effect that plays a crucial role in the sense of reality in video games and other applications of virtual worlds is the effect of lighting. In the real world, as observed through a person's visual sense, lighting effects are crucial to understanding events, progression of events, and an ability to understand and make decisions about the surroundings. The same is true for a user observing the scenes and developing action in a video game or other representation of virtual reality. It is highly desirable in the art that lighting effects be as real as possible.

In a virtual reality video presentation at the time of filing the present patent application there may be one or more avatars, a relatively large number of stationary objects, such as landscape elements, a relatively large number of moving or moveable objects, such as vehicles, weapons, and the like, and one or more light sources to be considered in an ongoing video display. And the light sources may be of differing types and strengths, and may be applied in different directions. A virtual reality game video differs markedly from a pre-recorded video in that there is player interaction in the game video that determines where and how objects and avatars will be presented in succeeding frames of the video. The video is dynamic. So avatars will move, objects may move, and light sources may move, change, or be switched on and off, or may be altered in direction, intensity and/or color.

In current art calculating lighting effects for objects in a video game with a number of objects and a number of different light sources of perhaps different types, such as point source, parallel or cone effect, and with different directions is a considerable challenge. Generally in current art the cost (magnitude of computation) is proportional to the number of lights per object, so overall cost in a general way may be considered as proportional to the number of lights multiplied by the number of objects to render according to the light intensity and direction.

methods have been developed to separate objects and light sources in a manner that the objects may be rendered and the lighting calculated for each as proportional to the number and intensity of the sources, but still in conventional art every frame, typically to be rendered thirty times per second, must be calculated from scratch for the lighting effects on every object.

The computing load for very busy videos, to keep them looking real, is a severe limitation to the number of objects and lighting variety that may be incorporated. What is clearly needed in the art is a new way to render lighting effects on objects in a dynamic video that has far less demand for computing power, but still renders very real effects.

BRIEF SUMMARY OF THE INVENTION

In one embodiment of the invention a system is provided, having a network-connected computerized server having a processor and a non-transitory physical storage medium and coded instructions executable on the processor, the coded instructions when executed causing the server to display a video game in an interactive interface to a player operating a computerized appliance connected to the server on the network, the video game comprising a virtual world of defined spatial dimensions having objects with defined dimensions and surfaces, one or more of the objects movable in the defined space of the virtual world by the player through one or more input mechanisms of the computerized appliance, and one or more light sources defined by position and direction in the virtual world, create and manage a voxel grid associated with the player, the voxel grid comprising a plurality of cells in a three-dimensional array occupying the a portion of the space of the virtual world, compute an occupancy value for individual ones of the cells of the voxel grid, the occupancy value depending at least in part on a portion of a cell occluded in the direction of a light source by at least a portion of one or more of the defined objects, compute an illumination value for individual ones of the cells of the voxel grid by consideration of one or more of the position and direction of the one or more defined light sources, the occupancy value of the cell for which an illumination value is to be determined, and illumination values of immediately adjacent cells in the voxel grid, and determine brightness for pixels in display of surfaces of objects in frames of the video game based at least in part on the determined illumination values of cells proximate to the surfaces of the objects in the virtual world.

In one embodiment the system of claim 1 further normalizes illumination values to a value between zero and one inclusive. Also in one embodiment the system selects the immediately adjacent cells in the voxel grid for using illumination values to influence the illumination value of an object cell.depending on direction of a light source. Also in one embodiment the system diminishes illumination value of a cell by the occupancy value determined for the cell.

Still in one embodiment the stem creates and manages a second voxel grid associated with a second player of the video game. Also in one embodiment the system redetermines illumination values for individual ones of the cells in the voxel grid in response to the player causing an object in the virtual world to be moved by a specific dimension in a direction. In some cases the system divides the voxel grid into individual regions and redetermines illumination values of for individual ones of the cells in the voxel grid only in one of the individual regions in response to the player causing an object to be moved. Further in some embodiments the system moves the voxel grid in the virtual world in the direction and by the dimension that the object is moved by the player, In some cases a cell in the voxel grid may be selected to use for illumination value for a portion of a surface by considering a normal to the surface pointing to an adjacent cell.

In another aspect of the invention a method is provided comprising displaying by a network-connected computerized server having a processor and a non-transitory physical storage medium and coded instructions executable on the processor, a video game in an interactive interface to a player operating a computerized appliance connected to the server on the network, the video game comprising a virtual world of defined spatial dimensions having objects with defined dimensions and surfaces, one or more of the objects movable in the defined space of the virtual world by the player through one or more input mechanisms of the computerized appliance, and one or more light sources defined by position and direction in the virtual world, creating and managing a voxel grid associated with the player, the voxel grid comprising a plurality of cells in a three-dimensional array occupying the a portion of the space of the virtual world, computing an occupancy value for individual ones of the cells of the voxel grid, the occupancy value depending at least in part on a portion of a cell occluded in the direction of a light source by at least a portion of one or more of the defined objects, computing an illumination value for individual ones of the cells of the voxel grid by consideration of one or more of the position and direction of the one or more defined light sources, the occupancy value of the cell for which an illumination value is to be determined, and illumination values of immediately adjacent cells in the voxel grid, and determining brightness for pixels in display of surfaces of objects in frames of the video game based at least in part on the determined illumination values of cells proximate to the surfaces of the objects in the virtual world.

In one embodiment the method comprises normalizing illumination values to a value between zero and one inclusive. Also in one embodiment the method comprises selecting the immediately adjacent cells in the voxel grid for using illumination values to influence the illumination value of an object cell.depending on direction of a light source. Still in one embodiment the method comprises diminishing illumination value of a cell by the occupancy value determined for the cell. Still in one embodiment the method comprises creating and managing a second voxel grid associated with a second player of the video game. Further in one embodiment the method comprises redetermining illumination values for individual ones of the cells in the voxel grid in response to the player causing an object in the virtual world to be moved by a specific dimension in a direction.

In a further embodiment the method comprises dividing the voxel grid into individual regions and redetermining illumination values of for individual ones of the cells in the voxel grid only in one of the individual regions in response to the player causing an object to be moved. Also in an embodiment the method comprises moving the voxel grid in the virtual world in the direction and by the dimension that the object is moved by the player, And in a further embodiment the method comprises selecting a cell in the voxel grid to use for illumination value for a portion of a surface by considering a normal to the surface pointing to an adjacent cell.

BRIEF DESCRIPTION OF THE SEVERAL VIEWS OF THE DRAWINGS

FIG. 5b is a view in direction L1 of FIG. 5a.

FIG. 5c is a view in direction L2 of FIG. 5a.

FIG. 5d is a view in the direction L3 of FIG. 5a.

DETAILED DESCRIPTION OF THE INVENTION

In various embodiments of the present invention lighting in successive frames of a dynamic video game is accomplished in a far different way than in the art current at the time of filing the present patent application. In this new and novel system at least one voxel (Volumetric Picture Element) grid is established in memory, the voxel grid having cells in a three-dimensional matrix representing at least a portion of the three-dimensional volume of a dynamic, interactive video game that is typically represented on a two-dimensional display. The cells in the voxel grid and portions of the virtual world of the video game share the same space, so relatively small regions of the virtual world are considered to be represented by cells in a voxel grid. Cells in such a grid may commonly be referred to as voxels, but will be referred to as cells in the voxel grid in this specification. Cells is an equally common terminology for the units in a voxel grid. An important purpose of the grid in embodiments of the present invention is to develop and organize data relative to lighting effects in displays of frames in the dynamic video game.

It is important to understand that a specific video game will be based on a virtual world in which landscape elements, light sources, avatars, objects such as vehicles, and much more are defined in memory. Not all of the virtual world may be seen in any particular frame in presentation. Consider, for example, a video game based on a specific, defined virtual world, in which multiple players may be involved simultaneously. Each player may have a first-person perspective. Each player may see in his or her display a relatively small part of the virtual world. That small part that one player may view dynamically may have lighting from a source that does not affect a portion of the virtual world seen by another player, and the portion seen by a different player may have different light sources, different landscape elements and the like. This leads to the important aspect that with multiple players there may well be multiple voxel grids in play, one perhaps for each player, and the voxel grid dedicated to the view and interaction of one player may be essentially different from that dedicated to another player. On the other hand, in some cases a voxel grid may serve two or more players who may be active in the same or closely related regions of the virtual world.

Figure 1:
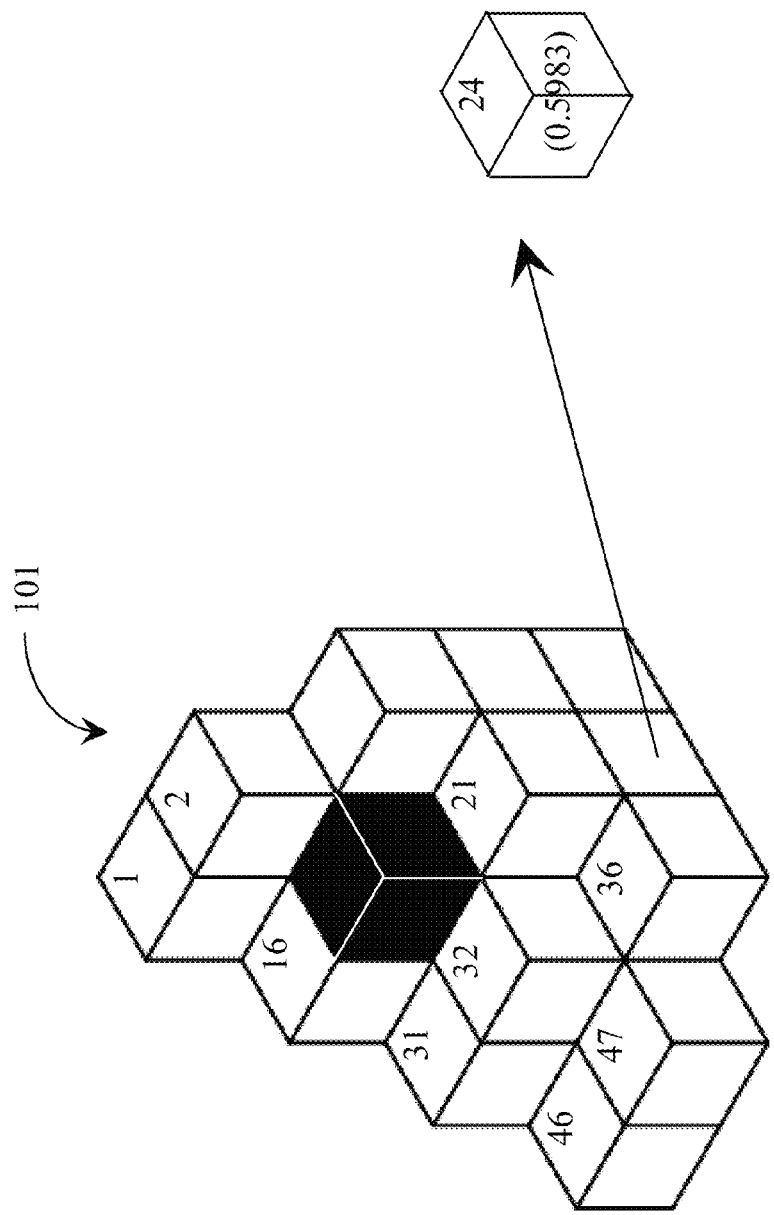
FIG. 1 is a representation of a portion of a voxel grid as used in an embodiment of the present invention.

FIG. 1 is a representation of a portion 101 of a voxel grid as may be used in an embodiment of the present invention. This representation is intentionally simplistic just to establish the notion of such a grid. Although in FIG. 1, only a small portion of the overall grid is shown, comprising only a few cells, one of which is shown shaded, it is apparent from FIG. 1 that the grid comprises individual cells, in this case square and immediately adjacent. It is not required that the cells be square, they could be rectangular, or even some other shape.

In this example cells are shown as part of a block of cells three high, four wide and four deep, which would have forty-eight cells in total. Cells are shown as numbered 1-48 for the overall block, beginning with one at top, back corner, proceeding across, then down row by row, then back to the top in another layer, and so on, to number all the cells shown. The cell numbers 1-48 represent the position of each cell in the grid, and is completely arbitrary. In applications of a voxel grid for lighting effects in embodiments of the present invention it is important that cells have unique identity as to position in space, because values associated with cells are used to control lighting effects for surfaces of objects in the immediate vicinity of the cells.

Cell 24 in this partial grid is shown as removed from the block, and has a number 0.5983 associated with the cell. This represents an illumination value specifically associated with this cell in an embodiment of the invention. Individual cells in a voxel grid in embodiments of the invention will have a similar illumination value.

An important purpose of a voxel grid in embodiments of the present invention is to store illumination data pertinent to the region of space in the virtual world that is represented by each cell in the grid. So individual cells in a voxel grid in an embodiment of the present invention are associated with at least one illumination value, in one embodiment normalized in the range 0 to 1. The number associated with a cell at the time of finalizing pixel values for a frame in the video game represents the effect of light to be applied to one or more surfaces of any object that at least partially shares or is closely associated with the space of the cell of the voxel grid.

In general, to provide illumination effects in an embodiment of the present invention a voxel grid is established having a width, height and depth consisting of a number of cells in each direction. The actual number of cells in each dimension of the grid is arbitrary, but may be determined by at least two important parameters. The number of cells needs to be great enough to make the cell size small enough so illumination effects on objects and characters, including shadow effects, is realistic, and small enough that the hardware and software dedicated to the game are fully capable of rendering all of the necessary effects on an ongoing basis.

An important concept in embodiments of the invention is that a specific illumination value is associated with an individual cell at all times, although individual values may vary as a player interacts with a game, for example moving an avatar or other objects, or even altering light sources in some way. Normalized, the specific value associated with each cell may be zero or any value up to 1.

Typically objects in a video game are codified as data regarding dimensions, surfaces, textures, and colors as well as position in the volumetric region of the virtual world the game. Textures and color are of particular importance in description of embodiments of this invention. There may be a great variety of colors assigned and applied to surfaces of objects in the game. Each color at an illumination value of zero will be black. An upper value of brightness may be preprogrammed for each color, and it is this upper value of brightness that is represented by a voxel cell value of 1 for any particular cell. The color has no bearing on the illumination value associated with a cell in the voxel grid, but, at the point of determining data for display, if a surface coincides with a cell having an illumination value of 1, and the surface is to be a particular shade of blue, that surface may be displayed as fully-illuminated blue. If the value of the cell in the voxel grid is 0.5, for example, the color will be displayed as less bright by half. Texture may be used at the time of applying illumination values as well to shade values in one direction or another.

Figure 2:
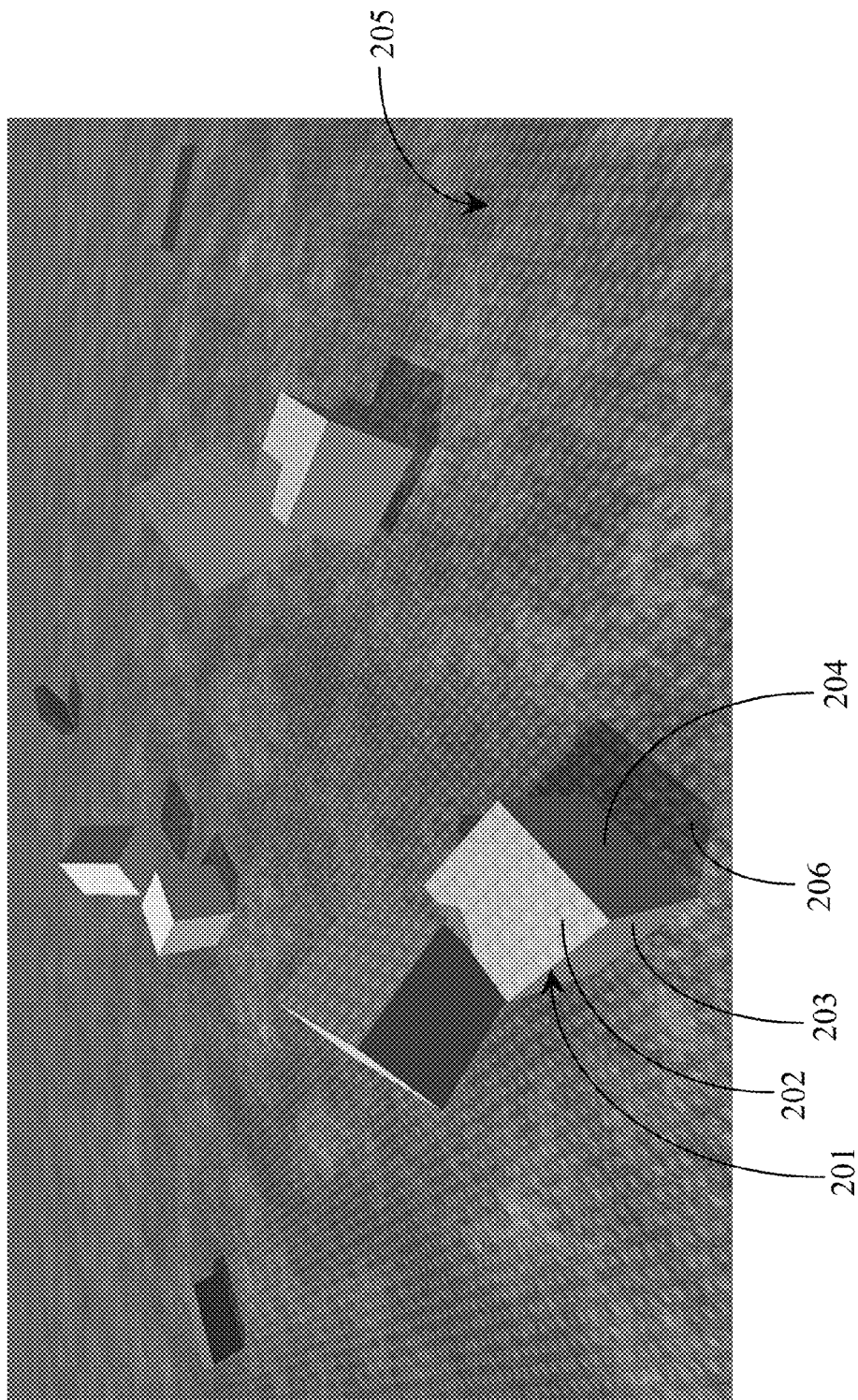
FIG. 2 is a display comprising a textured landscape and a variety of blocks in various positions relative to the landscape and to one another in an embodiment of the present invention.

FIG. 2 is a rather simple display comprising a textured landscape 205 and a variety of blocks in various positions relative to the landscape and to one another. Block 201, for example, has three visible surfaces 202, 203 and 204. The three surfaces show different levels of brightness, suggesting that there is a light source associated with the virtual world, positioned such that surface 202 is more fully illuminated than the other visible surfaces 203 and 204, and surface 203 receives more light than surface 204, which is apparently in shadow, as block 201 casts a shadow 206 on landscape 205. The shadow directions as well as the illumination levels of different surfaces clearly suggest that there is a light source associated above the landscape, somewhat to the left, and somewhat into the depth of the display, as shadows are cast down, to the right and forward. The illumination levels on the landscape, on various surfaces of the blocks, and the shadow positions and illumination levels are all effects that are produced in succeeding frames in embodiments of the present invention.

Figure 3:
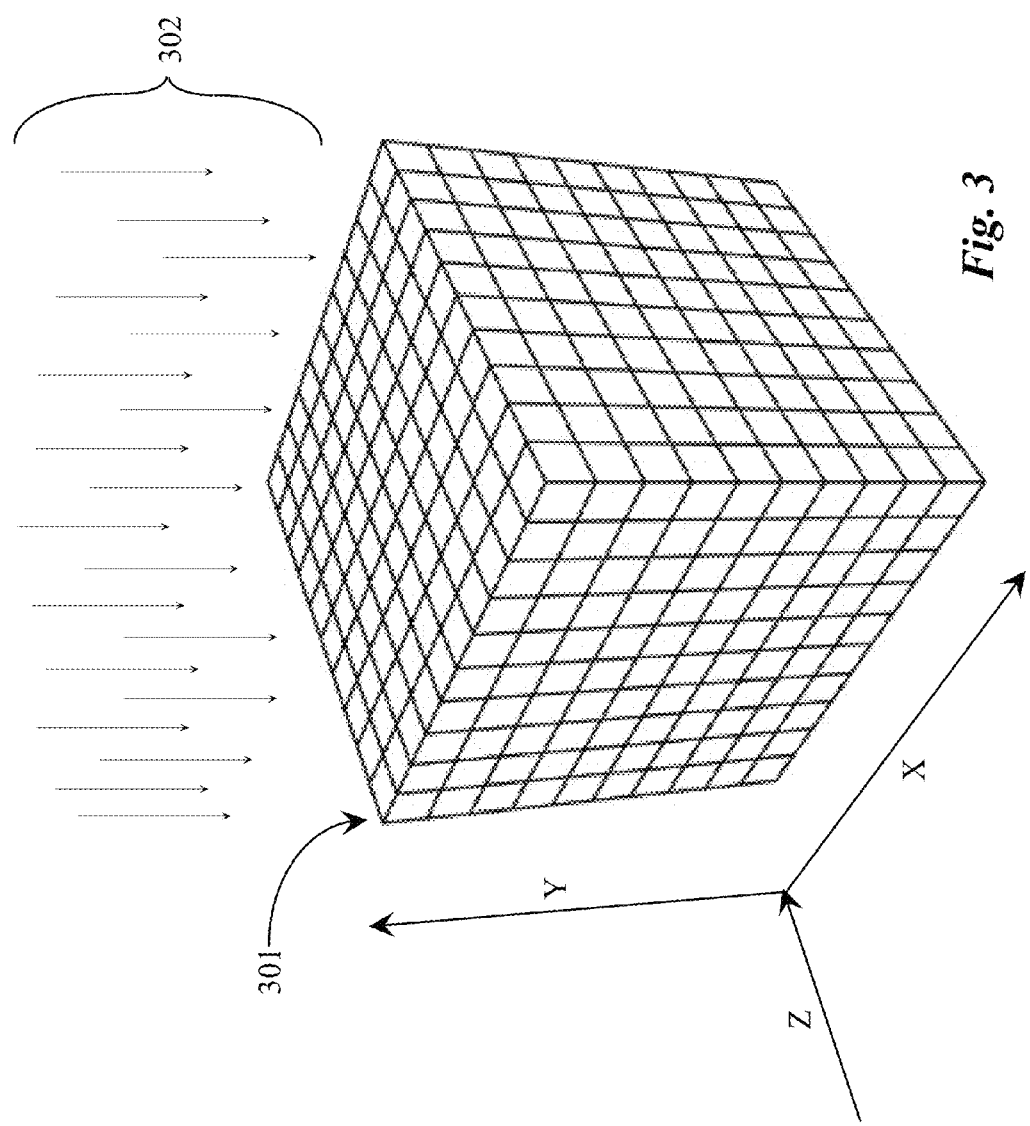
FIG. 3 is a perspective view of a more extensive voxel grid than that of FIG. 1, showing also a light source in an embodiment of the invention.

FIG. 3 is a perspective view of a more extensive voxel grid 301 than that of FIG. 1, showing also effect 302 of a parallel light source in an embodiment of the invention. Grid 301 is a Cartesian system and has an X axis, a Y axis and a Z axis, as shown. Light from the sun, illuminating a portion of a virtual world instantiated in grid 301, provides such a parallel light source, as the sun is so distant that all rays from the sun may be considered to be parallel. In this example parallel rays 302 are vertical and in the direction of the Y axis, orthogonal to the upper face of the voxel grid. In other circumstances the sun may be close to rising or setting, and the angle with the Z axis of the voxel grid would be acute. The rays from the sun in other circumstances may be at any angle from zero to ninety degrees with the upper face of the grid, and may be at different angles with the other axes of the grid as well, depending upon direction conventions that may be established for the virtual world. Further, there may be other light sources to consider, and these may be external or internal to the voxel grid, and may be point sources or cone sources. But certain principles in embodiments of the invention may be described in this embodiment referencing a single parallel source.

Although not shown in FIG. 3, each cell in Voxel grid 301 is coded by location in the grid, and each cell, before display of the video game begins, will have an illumination value determined and associated with the cell. The specific illumination value may be determined in a number of ways, and may be expressed at different times as a percentage, as a decimal, as a binary string, and in other ways as well, but since the purpose is to control illumination from a zero effect to a maximum effect, may be expressed normalized to a value from zero to 1 inclusive. There is no particular standard for the identification of the cells, it is just important that the ID for each cell be unique and associated specifically with geometric location, so each cell may be associated with surfaces of objects and landscape artifacts in the virtual world, each of which is also defined as to location in the virtual world, which tags are updated as objects move.

It is important to understand that, although the voxel grid that may be associated with the display of each of one or more players is described as cells having defined dimensions and location in the virtual world, and associated with a determined illumination value, that cells of the voxel grid and the values associated with the cells are virtual artifacts maintained in memory of the system to accomplish a purpose. These are not artifacts that are typically displayed. The idea is to have a value (the cell illumination value) at points in space that may be used to determine illumination intensity for surface of objects and other artifacts that share the same space as the voxel cells, or are closely proximal.

Referring again to FIG. 3, the parallel light effect 302 may be considered as external to voxel grid 301, and the top layer of cells of the voxel grid are all equally exposed to the rays of the parallel light source. Again, it is important to understand that the parallel light source may represent the effect of sunlight at high noon in this case, that is, directly overhead. But in another circumstance the same light source may represent lighting from reflection off of gaseous molecules in the atmosphere above a virtual world. If the world is outdoors, and the time is daytime, there will be such a parallel light effect from the sky in general. What the source represents, then, is a convention. The fact of the existence of the source, its location and type, and in some circumstances its strength, is an important issue in embodiments of the present invention.

The exposure of all of the cells in the top layer of voxel grid 301 may be a starting point. Unless there are objects above the voxel grid there can be no blocking (shadowing) of the parallel rays outside the cells of the grid. So each cell in the top layer may be assigned an illumination value of 1.0, representing full illumination, that is brightness. It is important also to understand at this point in the description that the fact of an illumination value for a cell that is other than zero, or high, such as maximum 1.0, will have no effect in display for a player unless there is an artifact, that is an object with a surface, a landscape artifact, an avatar, or some material presence at or near the location of the particular cell in the portion of the virtual world in view. Illumination effects are always associated with surfaces at the location of or quite near the voxel cells, and further description of the generation of such effects is provided below. At this point in the description the determination of illumination values for the cells in the grid is of considerable importance.

Initial Determination

It was described above that many video games in embodiments of the present invention may accommodate more than one player. The game itself may be served from an Internet-connected server or set of servers having considerable computer power and extensive memory resources. The individual players will be operating each their own computer platform connected to the Internet. Each player's platform has a display by which that player may view a portion of the virtual world of the game interactively, and each will have I/O mechanisms, such as mouse or trackball and keyboard, by which the player may interact with artifacts in the game, such as, for example, an avatar dedicated to that player, and perhaps created by that player.

A voxel grid for determining illumination effects for a particular player may be created, maintained, and associated with that particular player. A different voxel grid may be created, maintained and associated with a different player, and indeed with each different player that enters a game. In one embodiment all of the determination of voxel grids and illumination values in such grids may be provided by execution of algorithms at the server side. But in some embodiments some of the computer power may be provided by the player's platform, and values relative to a voxel grid associated with a player may be cached at the players platform.

When a new player enters a game, that new player may enter under some predefined constraints, including what that player may initially see on his/her display. That initial display will be associated with a portion of the virtual world for the game, and there may be landscape, avatars and objects displayed, and definition of one or more light sources as well.

At this time of entry, in an embodiment of the invention a voxel grid is associated with the portion of the virtual world displayed for the particular player, and algorithms are executed to determine illumination values for individual cells in the voxel grid, taking into account light sources and direction, object locations and the like. Then as the new player interacts with the game the illumination values will be adjusted as needed depending on changes in viewpoint, movement of objects and avatars and the like. The maintained and adjusted illumination values are used to control brightness for surfaces in that player's display. Description of these determinations are described in enabling detail below.

If a player leaves the game the player's view and the voxel grid associated with that player may be saved. In one aspect a returning player may enter the game again at a point previously left. In some aspects changes in the player's view may take place while the player is absent, and the view, circumstances, and grid values may be different when the player returns.

Dynamic Determination During Play

Most advantages from embodiments of the present invention accrue during play of a game. In conventional systems adjustment of illumination for surfaces as situations change have to be made for every frame, typically thirty times per second. With several movable avatars or objects under control of players of a game, and the possibility of altering light sources, dynamic determination of illumination for surfaces in conventional art is a computer-intensive challenge.

In embodiments of the present invention illumination for all surfaces need not be recalculated for an entire frame each time something changes. Illumination values for voxel cells need only be made immediately for cells in the immediate vicinity of an avatar or an object moving. Cells in other regions that may be affected by movement may be updated in subsequent frame periods. And in some circumstances in embodiments of the invention there are ways the computational load for this may be minimized such that management of illumination in embodiments of the invention is far less of a computational load than in conventional art. This will be clear in descriptions of voxel illumination value management below.

Returning again to FIG. 3, and remembering that the voxel grid may be associated with a particular player, and occupies typically just that volume of the defined virtual world of the game that may be seen by that player, every cell in the voxel grid will have an associated illumination value, determined by application of specific computation procedures described below according to position of objects in the volume of the grid and the presence, direction and strength of light sources in the particular part of the virtual world.

Figure 4:
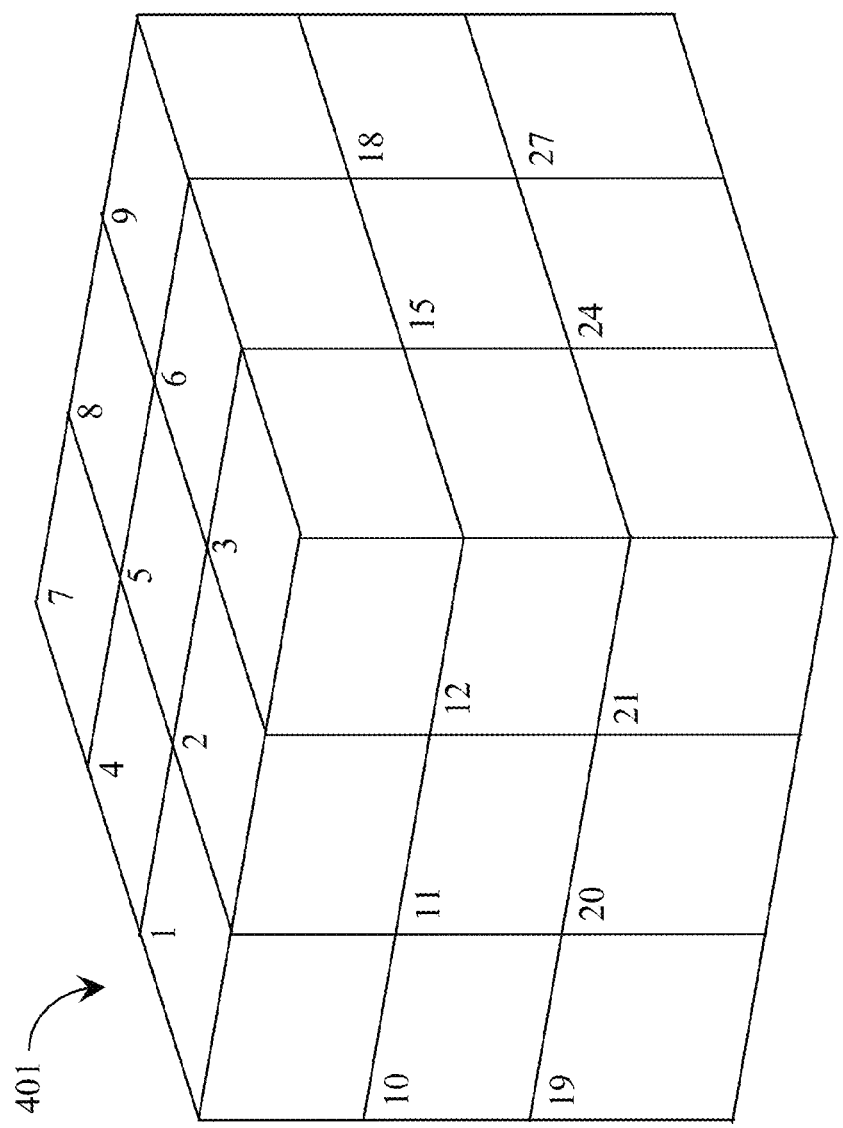
FIG. 4 is an illustration of a portion of a voxel grid useful in determining illumination values in an embodiment of the invention.

FIG. 4 illustrates a three-by-three subset 401 of adjacent cells of voxel grid 301 with the cells arbitrarily numbered 1 through 27. In embodiments of the present invention individual cells in the overall voxel grid have associated therewith an illumination value, which is a scalar value, not a vector. The illumination values for fringe cells illuminated by an external light source, as illustrated in FIG. 3, may be determined by direct consideration of an external light source. In this case all cells in the top layer of voxel grid 301 may have an illumination value of 1.0. Within the voxel grid, however, illumination value for a cell may be determined by application of algorithmic procedures that consider illumination values of one or more immediately adjacent cells, and occupancy of all or a portion of the cell by an object or a part of an object. Occupancy Occupancy value for a cell is a value determined by object definition and location in the virtual world, which also determines location in the voxel grid. For a cell that is located underground in a landscape artifact of opaque material the occupancy value may be considered to be 1.0, that is, fully occupied by some solid matter. For a cell 100% occupied by any opaque object or portion of an object the occupancy value may also be 1.0. For a cell under clear water the occupancy value may be perhaps 0.8, but may differ depending on how far below the surface, and for nature of the water, whether the water is clear or turbid, for example. For a cell 100% occupied by a translucent or transparent object or portion of an object, the occupancy value may be determined by the level of translucence or transparency. Finally, for occupancy less than 100% an occupancy value for a cell may be adjusted downward as well.

Figure 5A:
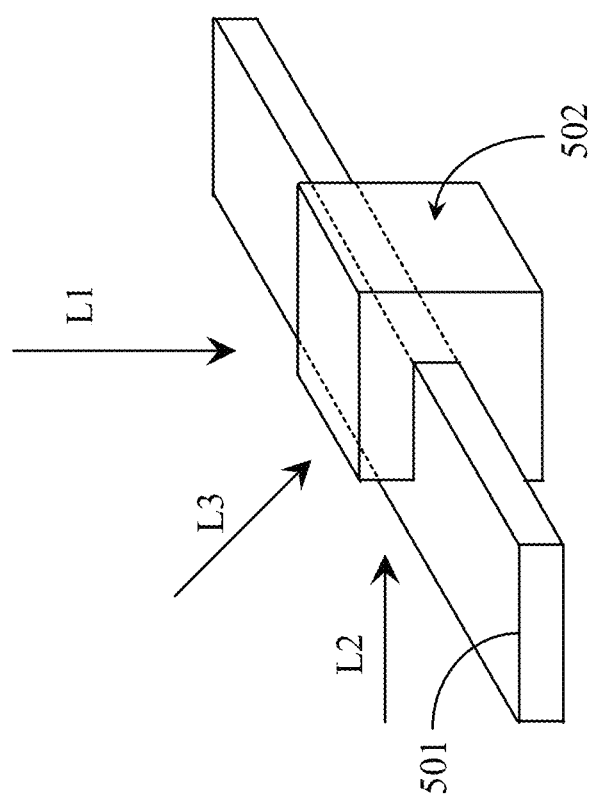
FIG. 5a illustrates a cell in a voxel grid and a rectangular object in the virtual world in a circumstance wherein the object intersects a portion of the cell in an embodiment of the invention.

FIG. 5a illustrates an arbitrary cell 502 in a voxel grid in an embodiment of the present invention and a rectangular object 501 in the associated virtual world in a circumstance wherein object 501 intersects a portion of cell 502. The adjacent cells are not shown in FIG. 5 to avoid confusion in the main point to be described regarding FIG. 5. It is clear that object 501 in this circumstance will also intersect other cells of the voxel grid, but the focus at this point is occupancy for cell 14. Occupancy values for other cells affected by object 501 will be determined separately.

An occupancy value for a cell in the voxel grid may be determined in essentially two different ways in embodiments of the present invention. The voxel cell grid is clearly a three-dimensional artifact, and occupancy of a cell seems to imply by the name that we are dealing with volume, and occupancy might may thus be considered from a volumetric viewpoint. Cell 502 has a volume, and that volume may be established based on the cell's dimensions. The dimensions may be relative dimensions as long as the same dimensional units are used for objects in the associated virtual world. Every object is defined in the data set of the virtual world by geometry, dimension and location. An algorithm is therefore easily established to determine the volumetric occupancy of cell 502 by the portion of object 501 that occupies a portion of the same space as cell 502. For sake of example, the occupancy of cell 14 by object 501 may be determined to be 0.125, that is, one eighth occupied by the portion of object 501 that is within the boundaries of cell 14.

However, another way that occupancy may be expressed is essentially two-dimensional. One might view cell 502 in one of the principle directions, X, Y or Z (see FIG. 3), or more preferably in the direction of a light source, and express occupancy as the occlusion of the cross section of cell 502 by object 501 in the considered direction. This version of occupancy is quite useful in embodiments of the invention particularly because, as will be seen in more detail below, order of effect from one cell to another in determining illumination values is strongly influenced by direction of light sources. The effect from cell to an adjacent cell may be thought of as a shadowing effect, which is then carried on from cell to cell in determining illumination values for further cells in the direction of the light source.

Note that in FIG. 5a three different light sources are illustrated as to direction, these being L1 straight down in Y direction, L2 horizontally in X digestion, and L3 at about a 45 degree angle between X and Y directions. There are, of course, a great many other directions that may be considered for direction of a light source.

Figure 5B:
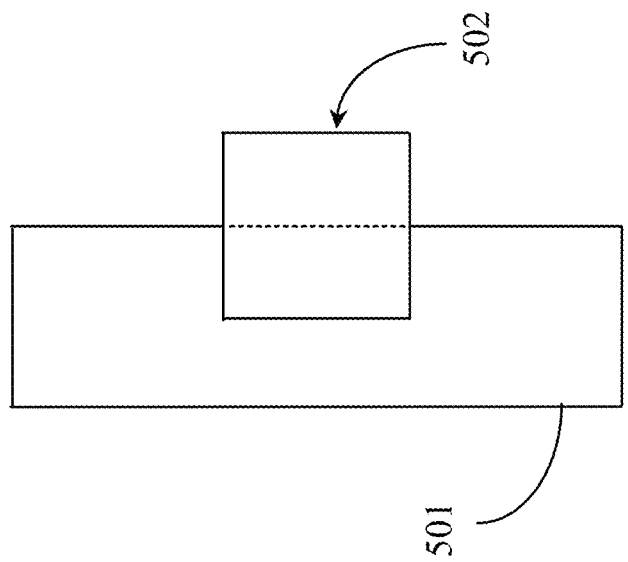
Figure 5C:
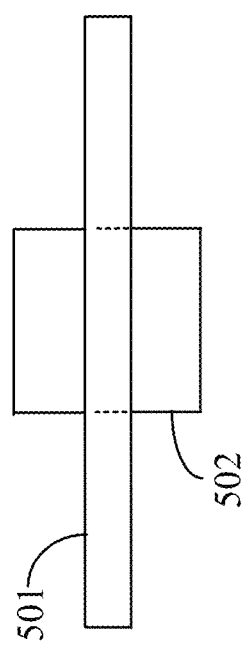
Figure 5D:
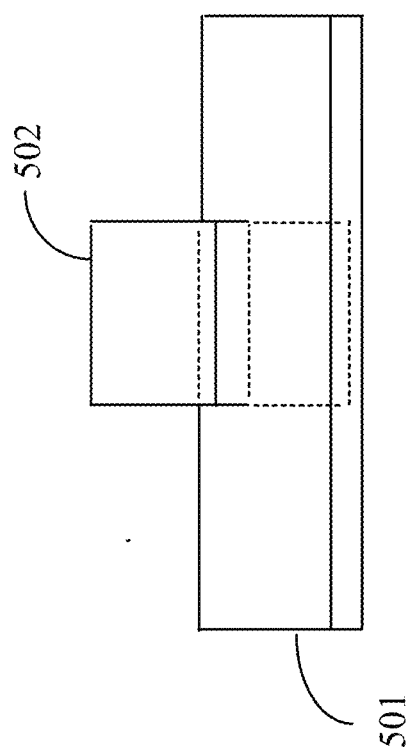

FIG. 5b is a plan view of cell 502 and object 501 with the viewpoint downward in the Y direction for light L1. I may be seen that, in this view, object 501 occludes cell 502 by 50%, so the occupancy may be 0.5. FIG. 5c is a view along the direction of light L2, and it may be seen that the occlusion of cell 502 is about 25%, so occupancy may be considered in this circumstance as 0.25. FIG. 5d is taken along the Z direction, and considering the direction of light L3. It may be seen that the occlusion in this instance is perhaps 60%, occupancy then about 0.6.

It will be apparent that there are considerably more complicated situations for occupancy determination considering light sources having angles with perhaps all three axes of the voxel grid and objects of perhaps more complicated geometry. The mathematics for the determinations is, however, straightforward, and perhaps simpler than the graphics to show the occlusion in many cases.

So in summary, it may be said that, given a voxel grid maintained in memory, a defined virtual world, and defined objects in the virtual world, considering the size, granularity and location of the voxel grid in the virtual world, an occupancy value may be determined and maintained for each cell in the voxel grid.

Architecture

As embodiments of the invention comprise rather sophisticated software and computation procedures for displaying video games, requiring input by players and updating of many values in creating and managing display, it is appropriate here to describe an architecture over which games may be played, and in which determinations may be made relative to lighting values for surfaces of objects in a game.

Figure 7:
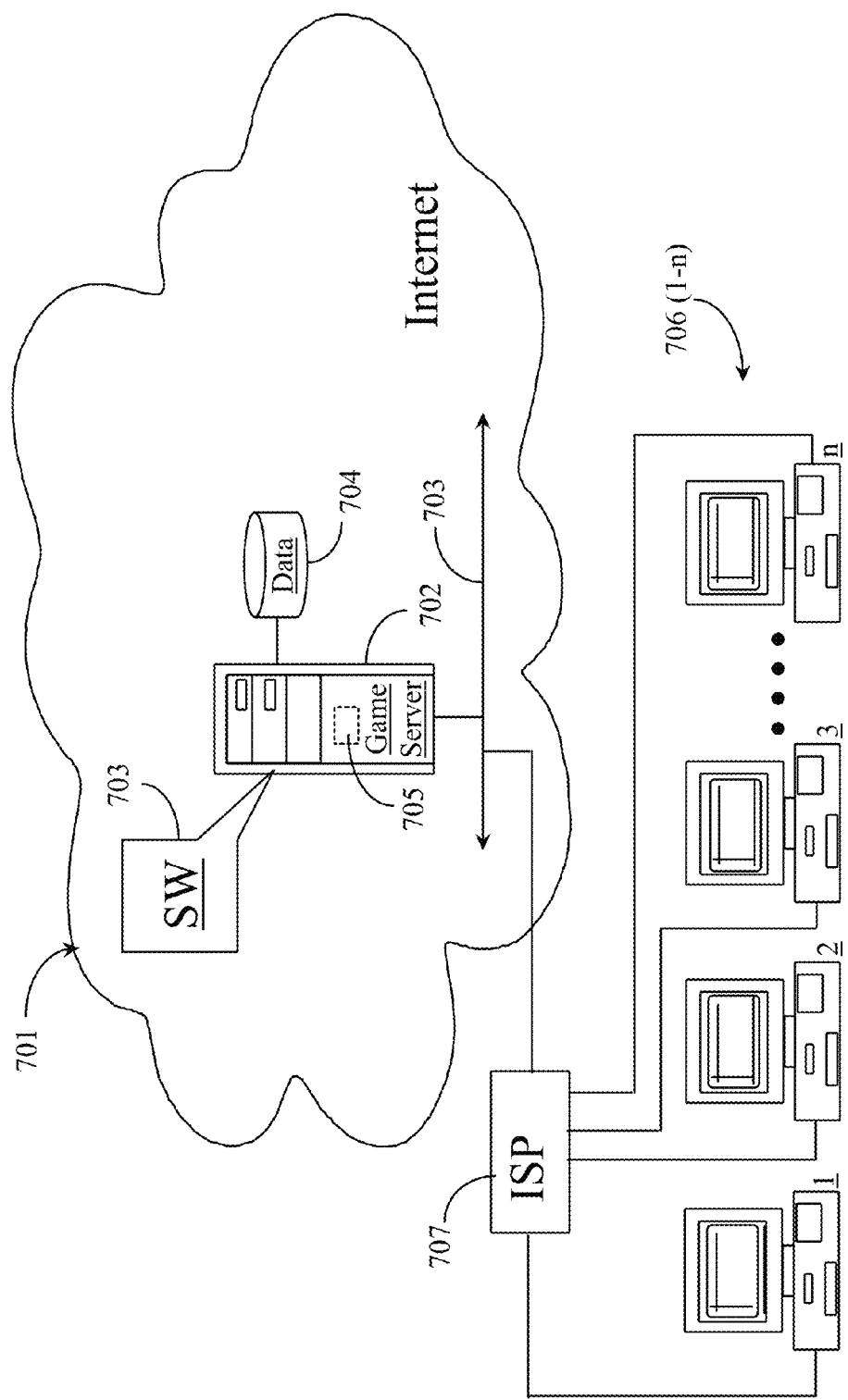
FIG. 7 is a diagram illustrating a generalized architecture over which video games may be displayed and played in embodiments of the present invention.

FIG. 7 is a diagram illustrating a generalized architecture over which video games may be displayed and played in embodiments of the present invention. At least one game server 702 having at least one processor 705 executing software (SW) 703 using data from a non-transitory data storage medium 704 is connected in the Internet network to Internet backbone 703, which path represents all of the myriad interconnections in the Internet. Client computerized appliances 706 (1-n) each connect to Internet backbone 703 through one or another Internet Service Provider (ISP) 707, and may connect thusly to game server 702. ISP 707 is representative of all the ways appliances capable of playing video games may connect to the Internet.

Game server 702 may provide one or more Web pages wherein clients using appliances 706 may select and play one or another video game. Upon selection and initiation game server 702 through SW 703 will provide a display for the client on a display screen of the client's appliance, enabling the client to interact with objects of the game, and server 702 through SW 703 will update the client's game display as play continues. In embodiments of the present invention such games will have illumination of surfaces of objects and shadow effects determined with use of voxel grids according to embodiments of the present invention.

Determination of Illumination Values

There is no invariable algorithm for the determination of illumination values for all cells in the voxel grid associated with a portion of a virtual world, nor is there an invariable order in which illumination values for cells are determined and updated, but there are rules for determining algorithms and weighting to be applied in one region or another under certain circumstances, and for subsets of cells to be updated, and the order in which cells in any subset are updated for illumination value. Some varying circumstances and useful procedures are described below.

Illumination values are typically determined for all cells in a voxel grid associated with a portion of the virtual world, these scalar values are stored in memory intimately associated with display circuitry, and are used along with object data governing surface definitions for objects in the virtual world, in determining brightness values for pixels associated with a display of a video game.

Returning now to FIG. 4, assume that the three-by-three array is a subset of cells in voxel grid 301 of FIG. 3, and the upper layer cells 1-9 of the three-by-three array have no occlusion from the light source 302, so it may be assumed the illumination value of each of cells 1-9 is maximum illumination, at 1.0. It remains to determine values for cells 10-27 (and all other cells in voxel grid 301). In embodiments of the invention the three-by-three array illustrated is in support of determining an illumination value for a central cell 14, not seen in the array. Generally speaking the illumination value for any cell in voxel grid 301 in an embodiment of this invention is determined considering illumination values of one or more immediately adjacent cells, and occupancy values for the object and adjacent cells.

Figure 6A:
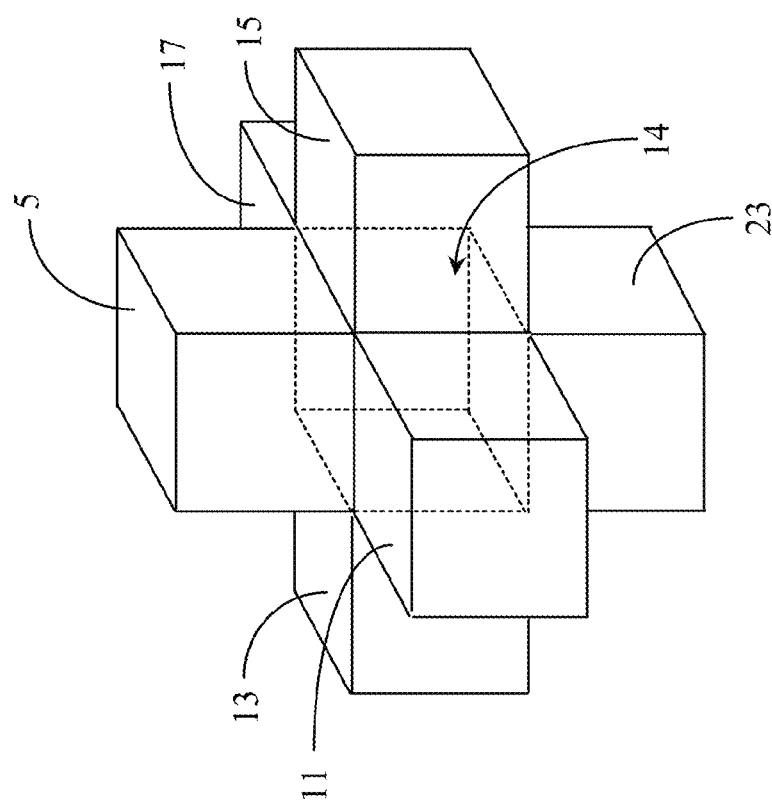
FIG. 6a is a view of central cell 14 of the three-by-three subset of cells of FIG. 4, showing in particular adjacent cells with which cell 14 shares a surface.

Consider now FIG. 6a, which shows the central cell 14 of the subset of FIG. 4, and cells 5, 11, 13, 15, 17 and 23 with which cell 14 shares a surface. In many embodiments of the invention adjacent cells with which the object cell, in this case cell 14, shares an edge or a corner, are not considered or used in determining illumination value.

It was stated above that illumination values for cells are determined both by occupancy values, that is, how much of a cell is occluded by an object, and illumination values for adjacent cells. It was also stated that occupancy is determined with a strong dependency on direction of the light source(s). Influence of adjacent cells on the illumination value of an object cell also is strongly dependent on light source direction.

Figure 6B:
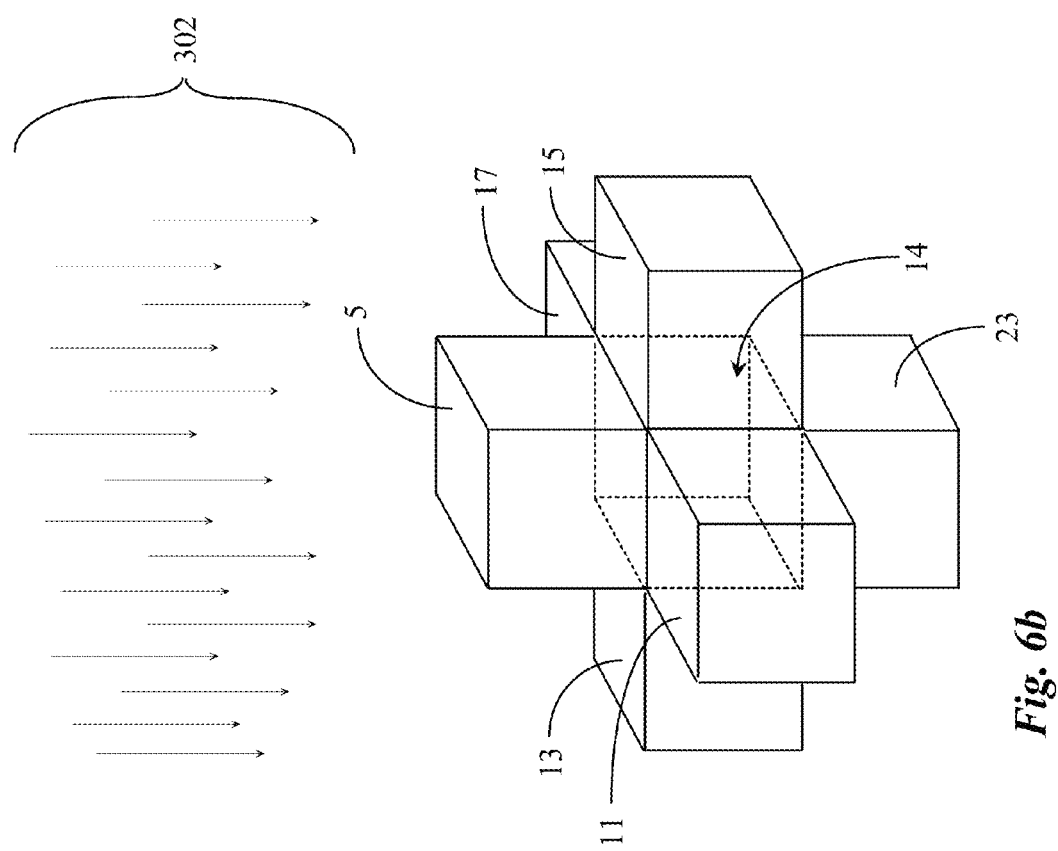
FIG. 6b is an illustration of the cells of FIG. 6a with a parallel light source from above.

FIG. 6b illustrates the cell subset of FIG. 6a with light direction from directly above and parallel light 302, as in FIG. 3 and light direction L1 in FIG. 5a. In this circumstance only the cell immediately above the object cell will be influential. So object cell 14 will be influenced by the value of cell 5 and by its own occupancy value. Assume the occupancy for cell 14 is 0.3 and the illumination value for cell 5 is 1.0, meaning that cell 5 is not occluded or shadowed from the original light source. Since determination is in the direction of the light source, cell 14 would have an illumination value of 1.0, influenced by cell 5, except cell 14 has occupancy of 0.3. The occupancy is subtracted from 1.0 to determine the illumination value for cell 14, which is now 0.7. Further, since cell 14 also strongly influences cell 23, directly below, cell 23, if not occupied, will assume an illumination value of 0.7, like cell 14.

Now consider that cell 23 is occupied, and has an occupancy value of 0.1. Cell 23 will inherit the illumination value 0.7 from cell 14, and that will be diminished by the occupancy value 0.1 for a final illumination value for cell 23 of 0.6. Values will continue to be determined in this fashion in the direction of L1 for further cells through the height of the voxel grid. The same process will determine illumination values for all other cells in the voxel grid in the same way, with determinations made in many embodiments in parallel.

The same discussion and rationale may apply for the use case in which the light direction is L2 in FIG. 5a, except the propagation of determination will be from left to right in the direction of the light source, and each cell will have a strong influence oin the proximate cell to the right.

Figure 6C:
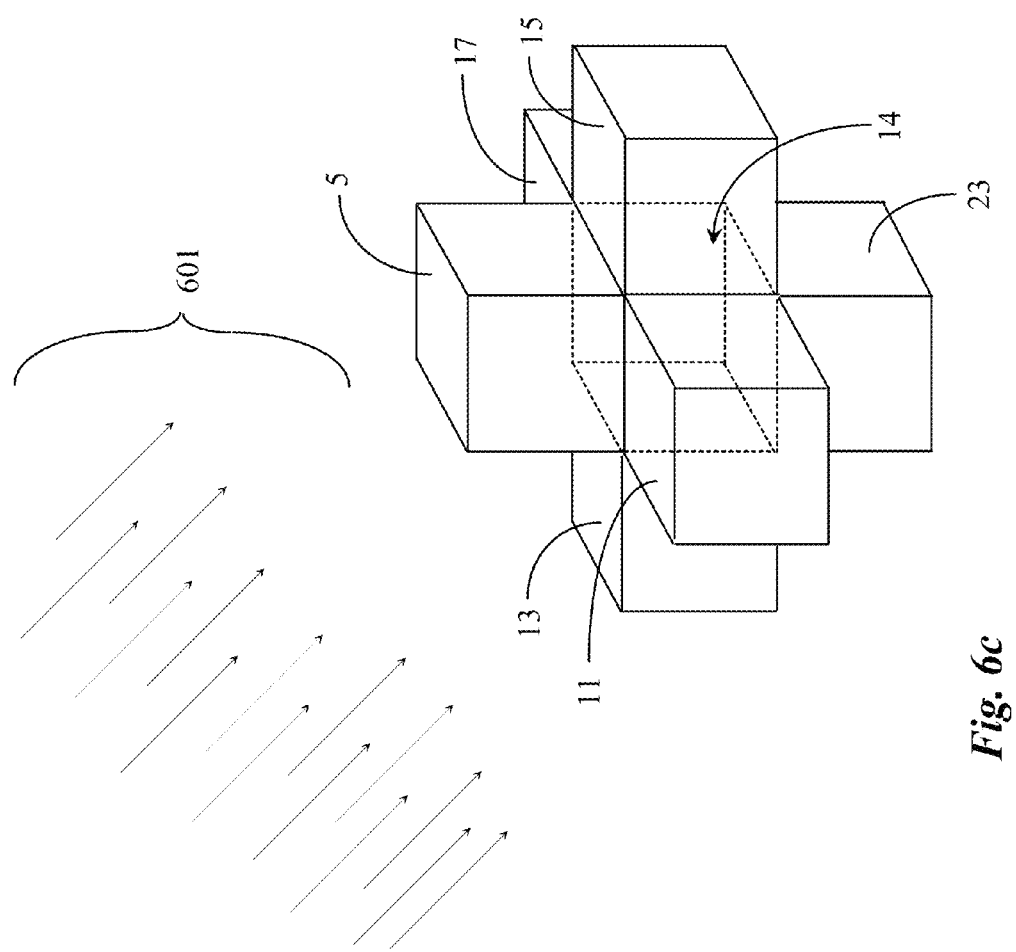
FIG. 6c is an illustration of the cells of FIG. 6a with a light source at 45 degrees from above left.

Now consider the circumstance as shown in FIG. 6c, in which the light 601 is a parallel light at an angle of 45 degrees from above left, the rays in the plane of the X-Y axes. In this example the illumination value for cell 13 is considered to be established, because determination is in the direction of the light source. If the illumination value for cell 13 is less than 1.0, say 0.9, that will have a strong effect on the value for cell 14, but the effect may be weighted by the fact of the angle of the light source. Cell 5 will also have a weighted effect on cell 14. If the weight is 0.5 for each of cells 13 and 5 in their effect on cell 14, and each has an illumination value of 1.0, then cell 14 will inherit 0.5 from both, for a value of 1.0, if there is no occupancy for cell 14. If there is occupancy for cell 14, that value will be subtracted.

If for example, cell 13 has an illumination value of 0.7, and cell 5 an illumination value of 1.0, and cell 14 is not occupied, then cell 14 may be determined to have an illumination value of 0.5+0.35, or 0.85.

There are much more complicated situations for which light directions and cell-to-cell influence may be determined, but generally in embodiments of the invention occupancy is determined first, then illumination values are determined cell to cell in the direction of light sources, using weighted values depending on light direction, and then diminished by occupancy value.

As described above, one of the distinct advantages accruing from embodiments of the present invention is that once initial illumination values are determined for voxel cells, it is only necessary to update values for cells when something changes, such as movement of an object in the virtual world. Moreover, movement of an object typically will not affect illumination values for a great number of cells as compared to the total number of cells in the voxel grid. However, when something changes, and the system begins to update and recalculate illumination values, cells may be considered for recalculation for which conditions have not changed at all. It is important, then, at the point in time of recalculation, to determine if conditions have, in fact, changed, and if so, by how much. It may be that occupancy value has changed for a cell, but only by a very small amount, below, perhaps, a preset threshold, and illumination values for surrounding cells have not changed. In this situation the system SW may not recalculate the illumination value for that particular cell, and may go on to another cell.

Order of Calculation

The order of calculation in the direction of light, cell-to-cell, is a unique way to determine shadowing without calculation for each object surface considering for each surface or part of a complicated surface, the light source and direction, and any and all occlusion between the light source and the surface. In embodiments of the invention a three-dimensional array of illumination effect constants is maintained, and illumination at a surface may be determined by the illumination values in the proximal region to the surface.

Regional Illumination Management (Fringe-Gate Effect)

It was described above that changes that occur in the virtual world of a video game in embodiments of the invention within the region of a voxel grid may be incremental, and may affect only a relatively small region of the space of the voxel grid. This means that for management of illumination in embodiments of the present invention the voxel grid may be divided into distinct regions, and recalculation of illumination values may need be made for just one region in an instance of a movement of an object or other change.

Figure 8:
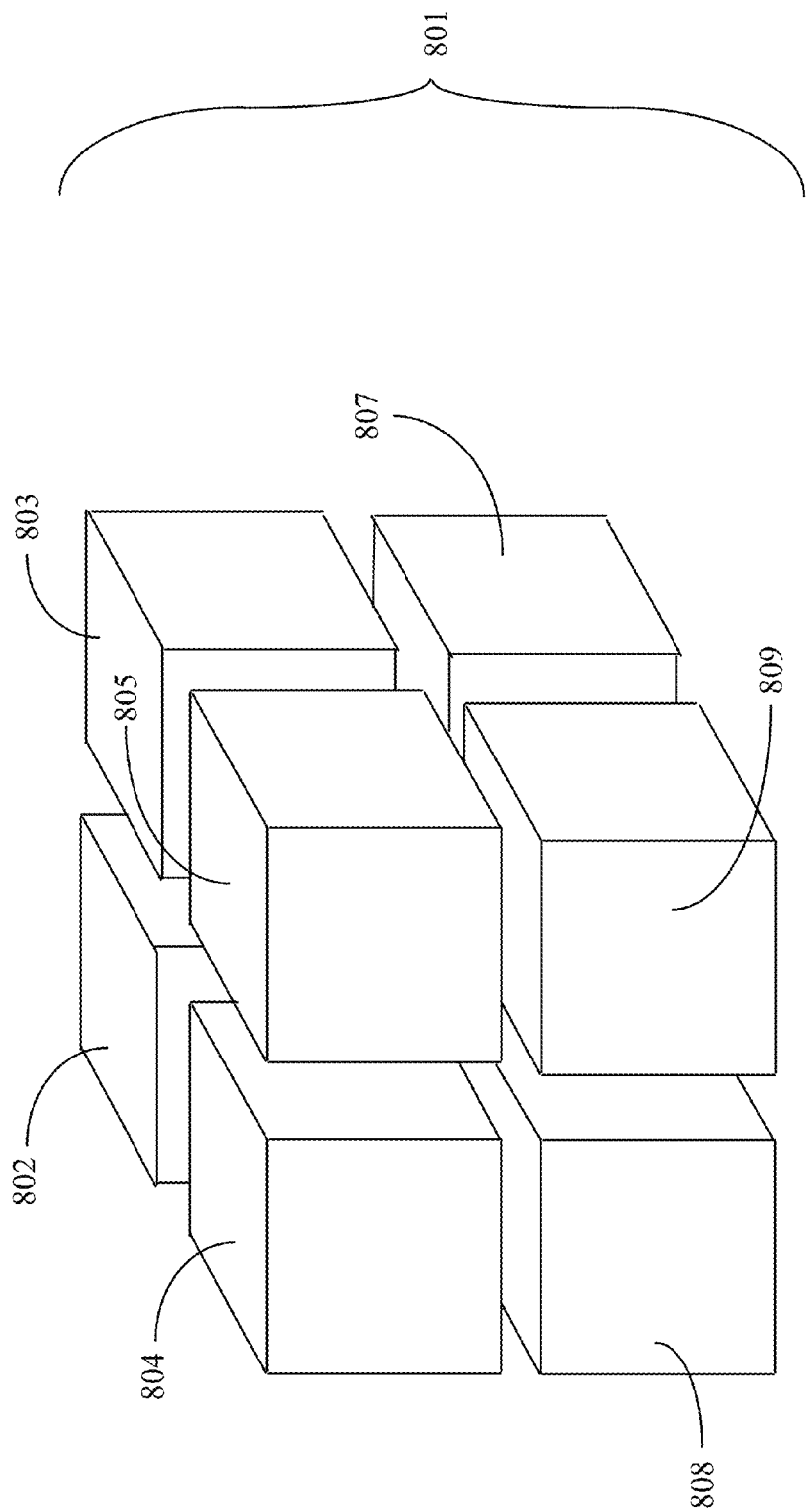
FIG. 8 shows a voxel grid divided into separate regions in an embodiment of the invention.

Assume for example that we arbitrarily divide a voxel grid into eight equal volume regions. FIG. 8 illustrates this situation with grid 801 divided into eight regions 802 through 809, exploded (separated) for better description, although region 806 may not be seen in FIG. 8. It should be noted that these octiles of the overall voxel grid comprise smaller voxel grids of numerous cells in a cartesian arrangement. The individual cells are not shown to avoid confusion.

Each region depicted in FIG. 8 has four fringe planes, each comprising a layer of cells in a planar array. Consider that an object, for example an avatar character, wholly contained in region 808 moves by a few cell dimensions in a frame time interval, but stays entirely in region 808. In this circumstance it may be necessary only to recalculate illumination values for some cells in region 808, but no recalculation in any one of the other seven regions may be necessary. Assume that a small movement is made with an avatar, for example, in region 804. Some cells will have to be recalculated in region 804, and perhaps some cells in region 808 as well, as the prevailing light source is parallel directly downward from above regions 802, 803, 804 and 805. If an avatar that partially occupies regions 802 and 804 moves, at may be necessary to recalculate values in 802, 804, 806 and 808, but perhaps still just four of the eight regions.

In one embodiment the effect of changes in one region on any necessity to do some recalculation in another region may be determined by changes in a fringe layer of the subject region sharing a surface with an adjacent region. Consider, for example, a change in region 804. In one embodiment the system may make the needed recalculations in region 804, and if those recalculations result in different illumination values in the bottom layer of region 804 (abutting region 808), the system will recalculate at least some illumination values for cells in region 808.

For the single, vertical parallel light source we have considered, this "fringe gate" concept is relatively simple. For circumstances with perhaps a plurality of light sources of perhaps different types, and having perhaps different directions, the fringe gate concept becomes somewhat more complex, but still affords a way to limit unnecessary recalculation. In general two or more light sources may require sequential sets of calculations for illumination values associated with cells.

It should be noted that the number and volume of sub-regions into which an overall voxel grid may be divided is not fixed, but may be set for any video game according to such features as granularity of objects in the virtual world. A world comprising quite small objects that might move may be divided into smaller regions voxel grids and smaller sub-regions for example.

Moving Window Effects

Figure 9:
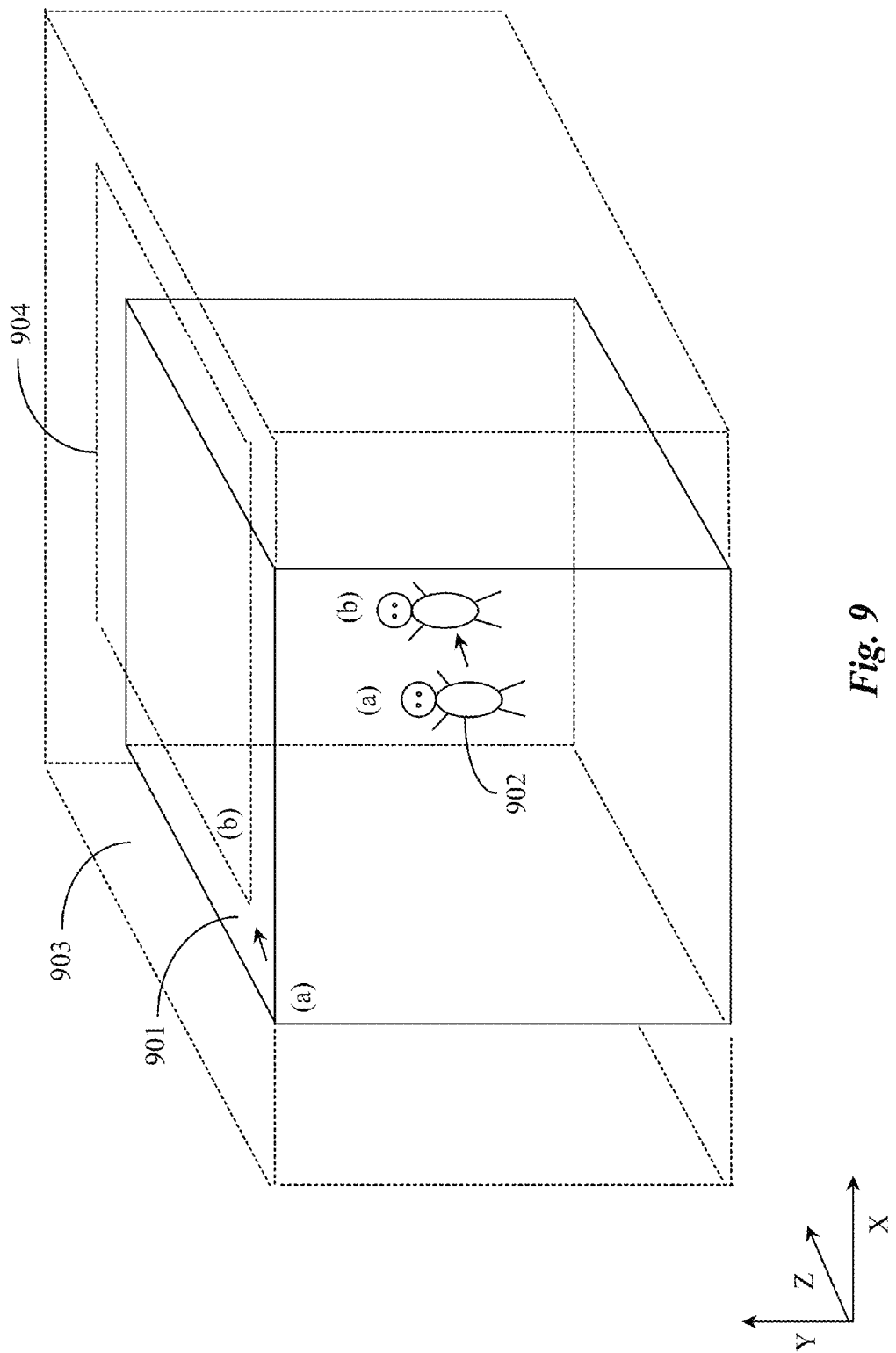
FIG. 9 illustrates an avatar 902 in a virtual world defined in region a region of FIG. 8 in an embodiment of the invention.

Another novel concept in embodiments of the present invention involves what may be termed a moving window effect, but might more properly be termed a moving grid effect. FIG. 9 illustrates an avatar 902 in a virtual world defined in region 903, with a smaller voxel grid 901 instantiated within the virtual world. Consider that avatar 902 illustrated with solid lines represents a position (a) of the avatar in the virtual world at one point in time. Consider that a player, with whom voxel grid 901 is associated, interacts with the game to move avatar 902 to a new position (b).

According to description of embodiments of the invention thus far, the voxel grid 901 is positioned within and with respect to virtual world 903. Movement of the avatar 902 will typically require recalculation of illumination values of at least a plurality of cells in voxel grid 901.

An option to leaving the voxel grid positioned as before with respect to the virtual world, is to "float" the grid and reposition the grid relative to the virtual world, moving the grid in the same direction and by the same amount as the avatar has moved. In many situations this moving grid effect will result in fewer recalculations than leaving the grid positioned rigidly to the virtual world.

Illumination and Self-Occlusion

It remains to describe how, at the point of display, illumination values associated with cell positions in a voxel grid may be used to determine brightness for surfaces in a display for a player of a game based on the virtual world.

Figure 10:
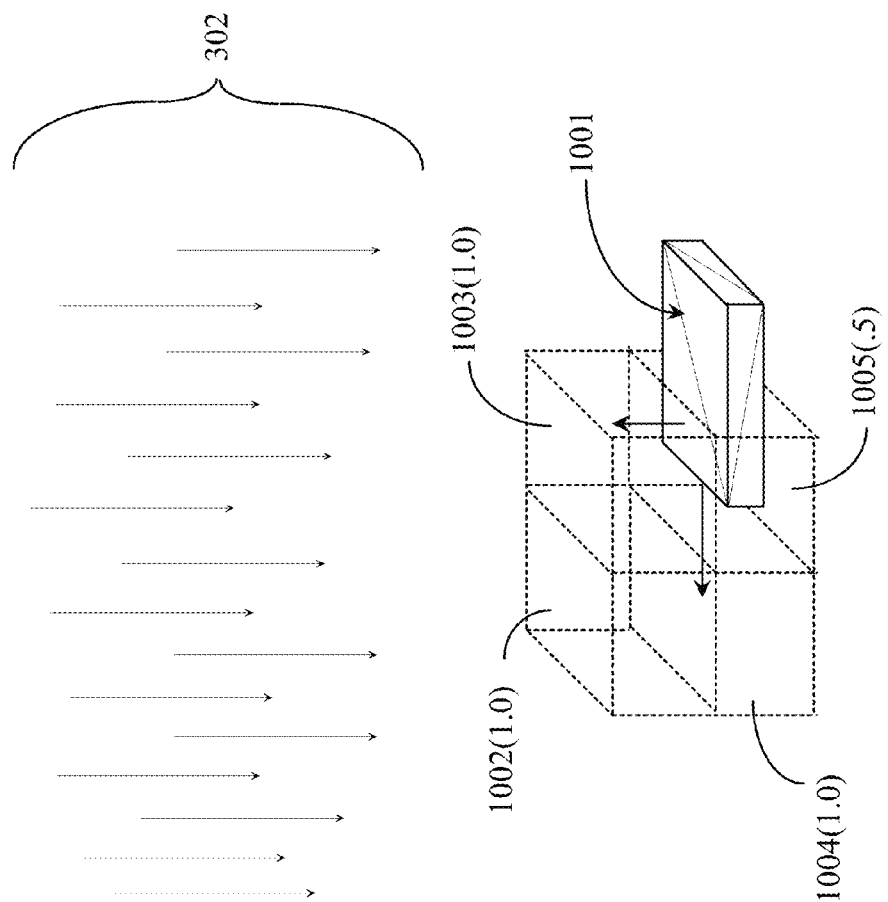
FIG. 10 is an illustration of a block object oriented with top and bottom surfaces 1 horizontal in an embodiment of the present invention.

FIG. 10 is an illustration of a block object 1001, oriented with top and bottom surfaces 1 horizontal, in the plane of axes x and Z. As is conventional in display technology, surfaces are rendered as combinations of triangles. The top surface of block 1001 is shown as two triangles combined to form the rectangular top surface. The vertical edges that are seen in this view are also formed of triangles.

In embodiments of the invention each surface is illuminated according to illumination values of proximate cells in the voxel grid. In this example four cells 1002, 1003, 1004 and 1005 are shown. Cells 1002, 1003 and 1004 have each an illumination value of 1.0 (maximum). Cell 1005 is partly (0.5) occupied by block 1001, and thus has an illumination value of 0.5. There is a potential problem here that the inventors term "self-occlusion", in that the top surface of the block, since there is no shadowing from top down, as evidenced by the light direction, and the 1.0 illumination value of cell 1003, should clearly have maximum illumination. If the diminished illumination value for cell 1005 at 0.5 is used, however, the block is self occluded.

The answer is to use normals to the surface triangles in every case to determine the right cell from which to take the illumination value to govern the brightness for that particular triangle. In this example the normal to one of the triangles of the upper surface is shown, and leads to adjacent cell 1003, having an illumination value of 1.0, which then us used for determining the brightness for the upper surface of the block.

In each case of a triangular component of a surface of an object that at least partially occupies a cell, the normals are used to lead to an adjacent cell, and the illumination value of that adjacent cell is used to determine brightness for pixels that are used to display the triangular component of that surface.

It will be apparent to the skilled person that the examples selected to illustrate embodiments of the invention in this specification are intentionally selected to be rather simple. This is to avoid undue confusion by complicated graphics. The same principles that govern the rather simple examples described also govern the more complicated situations. In addition it will be apparent to the skilled person that that there may be a variety of alterations and differences in the example described that will also fall within the scope of the invention, that is limited only by the claims that follow.

The invention claimed is:

1. A system comprising:
   a network-connected computerized server having a processor and a non-transitory physical storage medium; and
   coded instructions executable on the processor, the coded instructions when executed causing the server to:

display a video game in an interactive interface to a player operating a computerized appliance connected to the server on the network, the video game comprising a virtual world of defined spatial dimensions having objects with defined dimensions and surfaces, one or more of the objects movable in the defined space of the virtual world by the player through one or more input mechanisms of the computerized appliance, and one or more light sources defined by position and direction in the virtual world;

create and manage a voxel grid associated with the player, the voxel grid comprising a plurality of cells in a three-dimensional array occupying a portion of the space of the virtual world;

compute an occupancy value for individual ones of the cells of the voxel grid, the occupancy value depending at least in part on a portion of a cell occluded in the direction of a light source by at least a portion of one or more of the defined objects;

compute an illumination value for individual ones of the cells of the voxel grid by consideration of one or more of the position and direction of the one or more defined light sources, the occupancy value of the cell for which an illumination value is to be determined, and illumination values of immediately adjacent cells in the voxel grid, the immediately adjacent cells selected depending on direction of a light source; and determine brightness for pixels in display of surfaces of objects in frames of the video game based at least in part on the determined illumination values of cells proximate to the surfaces of the objects in the virtual world.

2. The system of claim 1 further comprising:
normalizing illumination values to a value between zero and one inclusive.

3. The system of claim 1 further comprising:
diminishing illumination value of a cell by the occupancy value determined for the cell.

4. The system of claim 1 further comprising:
creating and managing a second voxel grid associated with a second player of the video game.

5. The system of claim 1 further comprising: redetermining illumination values for individual ones of the cells in the voxel grid in response to the player causing an object in the virtual world to be moved by a specific dimension in a direction.

6. The system of claim 5 further comprising: dividing the voxel grid into individual regions and redetermining illumination values for individual ones of the cells in the voxel grid only in one of the individual regions in response to the player causing an object to be moved.

7. The system of claim 5 further comprising: moving the voxel grid in the virtual world in the direction and by the dimension that the object is moved by the player.

8. The system of claim 1 further comprising:
selecting a cell in the voxel grid to use for illumination value for a portion of a surface by considering a normal to the surface pointing to an adjacent cell.

9. A method comprising:
displaying by a network-connected computerized server having a processor and a non-transitory physical storage medium and coded instructions executable on the processor, a video game in an interactive interface to a player operating a computerized appliance connected to the server on the network, the video game comprising a virtual world of defined spatial dimensions having objects with defined dimensions and surfaces, one or more of the objects movable in the defined space of the virtual world by the player through one or more input mechanisms of the computerized appliance, and one or more light sources defined by position and direction in the virtual world;

creating and managing a voxel grid associated with the player, the voxel grid comprising a plurality of cells in a three-dimensional array occupying the a portion of the space of the virtual world;

computing an occupancy value for individual ones of the cells of the voxel grid, the occupancy value depending at least in part on a portion of a cell occluded in the direction of a light source by at least a portion of one or more of the defined objects;

computing an illumination value for individual ones of the cells of the voxel grid by consideration of one or more of the position and direction of the one or more defined light sources, the occupancy value of the cell for which an illumination value is to be determined, and illumination values of immediately adjacent cells in the voxel grid, the immediately adjacent cells selected according to direction of a light source; and determining brightness for pixels in display of surfaces of objects in frames of the video game based at least in part on the determined illumination values of cells proximate to the surfaces of the objects in the virtual world.

10. The method of claim 9 further comprising:
normalizing illumination values to a value between zero and one inclusive.

11. The method of claim 9 further comprising:
diminishing illumination value of a cell by the occupancy value determined for the cell.

12. The method of claim 9 further comprising:
creating and managing a second voxel grid associated with a second player of the video game.

13. The method of claim 9 further comprising: redetermining illumination values for individual ones of the cells in the voxel grid in response to the player causing an object in the virtual world to be moved by a specific dimension in a direction.

14. The method of claim 13 further comprising: dividing the voxel grid into individual regions and redetermining illumination values for individual ones of the cells in the voxel grid only in one of the individual regions in response to the player causing an object to be moved.

15. The method of claim 13 further comprising: moving the voxel grid in the virtual world in the direction and by the dimension that the object is moved by the player.

16. The method of claim 9 further comprising:
selecting a cell in the voxel grid to use for illumination value for a portion of a surface by considering a normal to the surface pointing to an adjacent cell.

* * * * *